RECORDER USING FIBER OPTICS

Filed June 20, 1968

INVENTOR
Jack R. Lambert
BY
Wolf, Greenfield & Hieken

Jan. 12, 1971  J. R. LAMBERT  3,555,555
RECORDER USING FIBER OPTICS
Filed June 20, 1968  5 Sheets-Sheet 4

INVENTOR
Jack R. Lambert
BY
Wolf, Greenfield & Hicken

United States Patent Office 3,555,555
Patented Jan. 12, 1971

3,555,555
RECORDER USING FIBER OPTICS
Jack R. Lambert, Lexington, Mass., assignor, by mesne assignments, to Fibre-Optics Industries, Inc., Bedford, Mass., a corporation of Delaware
Filed June 20, 1968, Ser. No. 738,517
Int. Cl. A61b 5/08; G01d 9/12; G02b 5/14
U.S. Cl. 346—30                                                          9 Claims

ABSTRACT OF THE DISCLOSURE

A recorder for visually recording on light sensitive film an input signal which quantitatively varies over a period of time. The input may comprise a form of spirograph in which a variable flow of air rotates a shaft through a fan. The shaft in turn moves one end of a flexible optical fiber which is aligned with the ends of the flexible optical fibers in an array along one axis in response to the magnitude of the input signal. Light projected through the one fiber is selectively distributed to the array in response to the magnitude of the input signal. Simultaneously the other end of the fiber array is moved along an orthogonally related axis over a selected time period by a motor drive so that the quantitative measure of the input information is measured in time relation by impinging the light from the fiber array onto the light sensitive film.

SUBJECT MATTER OF THE INVENTION

The present invention relates to a recording device and more particularly to a recording device which is capable of quantitatively recording input information visually on a recording medium over a time period.

BACKGROUND OF THE INVENTION

For some time there has been a need for a relatively compact improved visual recording device which operates simply and can be made for a comparatively low cost. Such a recorder which is capable of permanently recording information for visual display on a recording medium such as film, has significant utility in the medical, mechanical, electrical, hydraulic and other arts and businesses. In particular there is a significant need for such a recorder which can be used in the medical field to measure the timed vital capacity of a patient. And while there have been devices shown as spirographs available for such measurements, such spirographs as have been heretofore available are not altogether satisfactory, since among other things they are generally cumbersome, expensive, not portable, and often require the use of moving webs of paper with conventional marking pens.

BRIEF DESCRIPTION OF THE INVENTION

It is an object of the present invention to provide a small, compact, portable and comparatively inexpensive recorder which is capable of permanently recording quantitatively varying input information over a time period graphically on film. It is an object of this invention to provide means for recording a wide variety of information including, for example, air flow, fluid and gas flow, mechanical motion, electrical information and the like.

It is also an object of the present invention to provide a recorder capable of visually recording with exceptionally high definition input information with little or no reactance on the input source from the recording device itself.

A further object of the present invention is to provide a recording device having an input information receiving means which may be remote from the recording device itself with the input means adapted to be located in environments which are hostile to the major portions of the recording device. For example, the input means may be located in a furnace, in an explosive gas or liquid container, under water, in a corrosive gas or liquid container, in a high humidity environment, or in other locations in which the presence of the recording device itself would be inappropriate.

A further object of the present invention is to provide a recording device capable of permanently recording input information received from a wide variety of sources and under varying conditions including, for example, information from other machinery, equipment and instruments, such for example, as a galvanometer.

A further object of the present invention is to provide a recording device capable of successively and simultaneously receiving and recording a plurality of input signals which may, if desired, be recorded on the same recording medium with the signals superimposed one upon the other in varying codes to distinguish one from the other. The varying codes contemplated include tracing lines of different size or interrupted at different time intervals or of different colors.

A further object of the present invention provides a recording device which is capable of simultaneously recording an input signal on a permanent recording medium and of being visually monitored at one of a selected number of locations.

A further object of the present invention is to provide a recorder which is rugged and capable of being used in a wide variety of circumstances by people of limited skill with an inexpensive permanent recording medium which is easily available, capable of being replaced for subsequent recordings quickly and without any significant difficulty.

In the preferred embodiment of the present invention there is provided a replaceable recording medium upon which optically transmitted information may be recorded. An information input means for receiving quantitatively varying information over a time period may comprise a variety of devices capable of receiving input information in mechanical, electrical or other forms. A light source is provided with means for transmitting light from the light source to the recording medium whereby a recording of the light from the light source may be made upon the recording medium. Means are provided which are responsive to the information received by the information input means for controlling the location along one axis of the recording medium at which the transmitted light is recorded. Means are also provided for controlling along a second axis normal to the first mentioned axis the location on the recording medium at which the transmitted light is recorded at different time intervals whereby a tracing on the recording medium may be effected which is related along orthogonally related axes to the quantitative measure of the input information over a time period.

BRIEF DESCRIPTION OF THE DRAWINGS

These and other objects and advantages of the present invention will be more clearly understood when considered in connection with the accopanying drawings, in which.

DESCRIPTION OF PREFERRED EMBODIMENTS

Referring to FIGS. 1 through 5 there is illustrated a device designed primarily to record air flow on a photographic film, but other light sensitive material is also contemplated. The device described may also be adapted for measurement of other fluid flow. In particular this embodiment of the invention illustrates a recorder especially designed for medical use as a spirograph that records the timed vital capacity of an individual's lung. The timed vital capacity as used herein means the capacity of one's lungs as measured by the ability of one to exhale over a time period.

The principal components of the embodiment illustrated in FIGS. 1 to 5 include a recording means 1 upon which optically transmitted information may be recorded. This recording means 1 preferably comprises a pack of light sensitive film, preferably self-developing film of the type made by Polaroid Corp.

Information input means 20 are provided for receiving quantitatively varying information over a time period. This means in the embodiment described includes a tubular passage through which air may flow for subsequent measurements. A light source 40 and means 50 for transmitting light from the light source 40 to the recording medium 1 to record the light from the light source upon the recording medium may comprise an optical fiber system including two sections 51 and 51A. Means 60 measures information received by the information input means 20 and controls the location in response thereto along one axis of the recording medium 1 at which the transmitted light is recorded. This means 60 may comprise a threaded shaft 61 and carriage 62 adapted to be moved longitudinally upon rotation of the threaded shaft 61 with the shaft 61 rotated through an impeller 24 keyed to it and designed to be rotated by the flow of air through the input means 20. Means 90 are provided for controlling the location along a second axis normal to the first axis on the recording medium at which the transmitted light impinges at different time intervals. This means 90 comprises generally a motor driven shaft means adapted to move one end of the second optical section 51A longitudinally of the recording medium 1 and in optical relation to it.

Referring again to the recording means 1 in the embodiment shown, there is provided a series of eight film negatives which comprise the recording means 2. Preferably this may be in the form of a conventional Polaroid Corp. flat black and white film which is packed in a container 3. The film negatives are positioned within the container 3 with the upper wall of the container as viewed in FIG. 4 having an aperture through which the topmost film may be exposed. The film negative may be drawn successively from the container 3 by pulling tabs 13 in proper sequence. The container 3 of the film pack is contained within a recess in the recording casing 6 by a backer 7. The backer 7 forms the bottom of the recorder 6 and is secured to the sides by channels formed at either side of the recorder by the overhanging lips 8. The end of the backer 7 supports roll 9 that is adapted to rotate in pressured relation with roll 10. Roll 10 in turn is supported for rotation between the side walls 11 and 12 of the recorder by suitable means. The individual tabs 13 of the film negatives 2 extend between rolls 9 and 10 and may be pulled to draw the negatives 2 successively from the film pack after the film has been exposed by the mechanism hereafter described. As is conventional in Polaroid film, the negatives have self-contained developer which is spread over the exposed negative to develop it as the negative is pulled between rolls 9 and 10.

Figure 1:
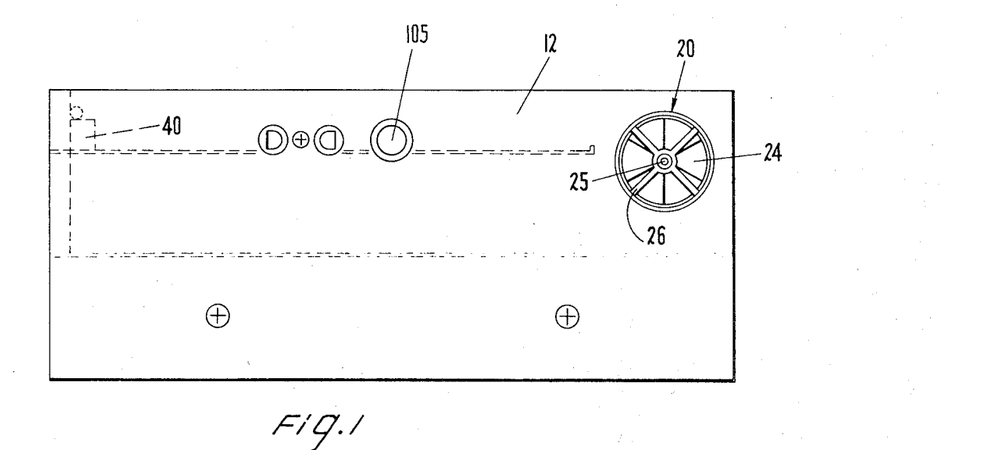
FIG. 1 is a side view of a recorder designed particularly as a spirograph for recording the timed vital capacity of one's breath, embodying the present invention.
Figure 2:
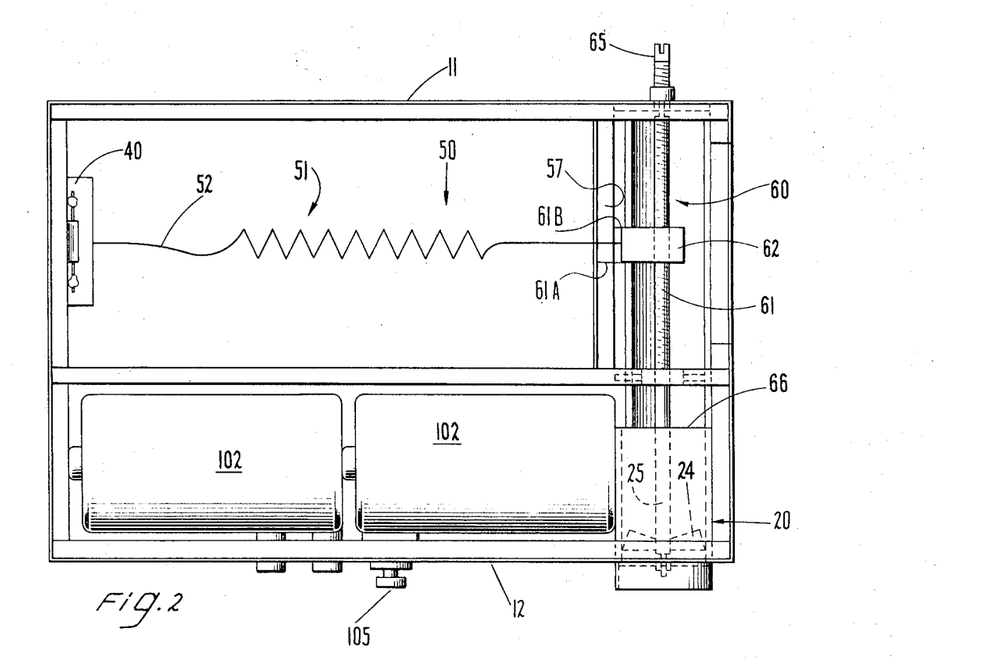
FIG. 2 is a top view of the recorder illustrated in FIG. 1 with the cover removed.

Input means 20 for receiving information in quantitatively varying forms preferably takes the form in the preferred embodiment of a tubular passage 21. This passage 21 extends inwardly from the side 12 of the recorder and is designed to receive a tubular extension 23. This tubular extension 23 may be connected to any suitable input means. In the specific example of a spirograph the tubular extension 23 is merely an elongated flexible tube which a patient may place to his mouth and breathe through. Any suitable means for frictionally engaging the end of the tube 23 with the tubular passage 21 may be provided. The tubular passage 21 is secured to the sidewall 12 and is formed with a fan 24 positioned within it. The fan 24 should be designed to rotate easily upon the flow of air through the passage 21. The fan may be supported on a shaft 25 in turn supported axially with respect to the passage 21 by spiders 26 at either end of the passage 21 (FIG. 1).

The means generally illustrated at 60 include, as previously mentioned, a threaded shaft 61 and a carriage 62 which is moved axially by the shaft 61 upon rotation of the shaft. The carriage 62 is maintained against rotation with shaft 61 by suitable means such as wires 61A and 61B which project respectively into engagement with opposite surfaces of elements 57 and 57'. The shaft 61 is connected directly to the fan 24 and may be common with shaft 25 of the fan. The other end of the shaft 61 may be conveniently mounted in bearing journals in wall 11. If desired a suitable bearing adjustment means for varying the tension of the shaft 61 may be provided with external access to this adjustment means illustrated at 65. Preferably shaft 61 is a very finely threaded shaft having in the order of 400 turns to the inch. Carriage 62 is suitably keyed to the shaft 61 so that upon rotation of the shaft in one direction when driven by fan 24 the carriage 62 will move axially in one direction, and upon rotation of the fan 24 in the other direction the carriage will move in the opposite axial direction. Sufficient access to the end 66 of the passage 21 should be provided so as to permit the fan to be driven in both directions by either drawing air through the passage 21 outwardly of the recorder or blowing air into the passage 21 inwardly of the recorder.

Movement of the carriage 62 in response to rotation of the shaft 61 is a quantitative measure of the volume or force of air rotating the fan 24 with the direction of movement of the carriage 62 also being a measure of the direction of flow of air by the fan 24.

Movement of the carriage 62 is operatively interrelated with the means 50 for recording the light from the light source 40 upon the recording means 1. In this arrangement the first section 51 of the optical system comprises an optical fiber 52 of conventional design. One end of this optical fiber is connected to the light source 40. The other end of this optical fiber 52 is connected and supported near its other end by the carriage 62. The intermediate portion of this fiber is preferably formed with a helical segment or accordian folded segment so as to minimize the drag or tension on the carriage 62. The extreme end of the fiber 52 which is carried by carriage 62 is longitudinally aligned in precise relation with the adjacent end 56 of the flexible fiber bundle or array 53 which comprises principally the second section 51A of the optical fiber system 50. The array 53 comprises a band of parallelly arranged optical fibers suitably and permanently secured together in a flexible band. The end 56 of this array 53 is rigidly clamped between the clamping elements 57 and 57' so that this end of the fiber array 53 is longitudinally aligned with the path of movement of adjacent end of fiber 52. Thus on longitudinal movement of the adjacent end of the fiber 52, light passing through the fiber 52 will impinge successively on the aligned ends of the fiber array 53. The width of the array 53 may vary, but preferably it should be as wide or almost as wide as the film negative upon which the recording is being made. The other end of the fiber array 53 is clamped between clamping members 58 and 58'. These clamping members comprise longitudinally extending plates that are suitably secured together by screws to rigidly hold the other ends of the fibers comprising the fiber array 53 in rigid and fixed longitudinal alignment. The clamping members 58 and 58' direct the other ends of the fiber array 53 downwardly into perpendicular alignment with the film negatives 2 so that light passing from the ends of the fiber array 53 impinges upon this uppermost negative and thereby effects an optical recording of the light.

Figure 3:
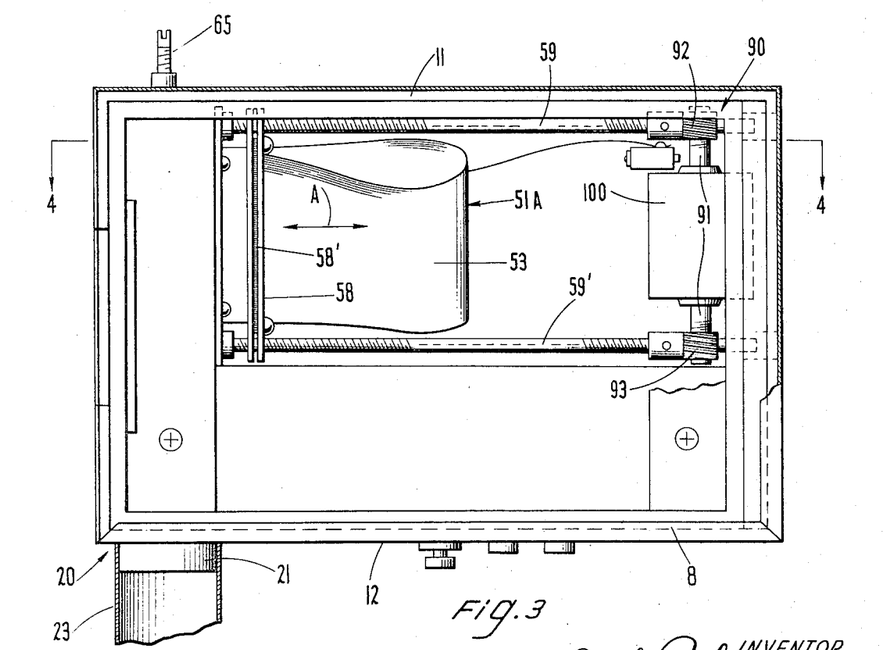
FIG. 3 is a bottom view of the recorder of FIG. 1.
Figure 4:
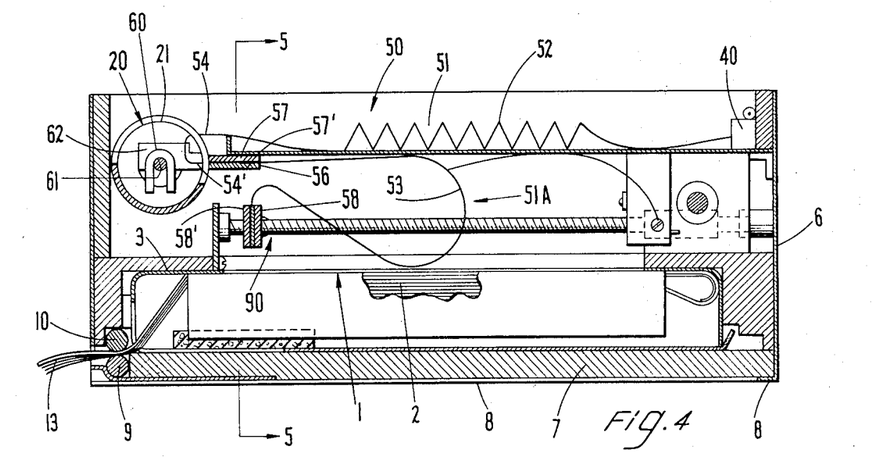
FIG. 4 is a side cross sectional view of the recorder of FIG. 1 taken substantially along the line 4—4 of FIG. 3.
Figure 5:
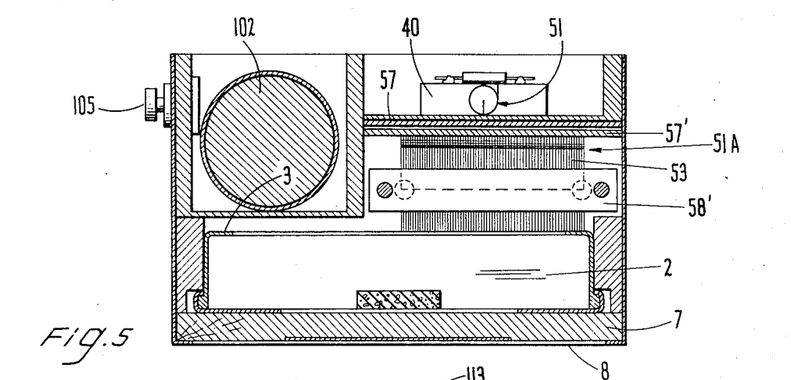
FIG. 5 is a cross sectional view taken along the line 5—5 of FIG. 4.

The clamping elements 58 and 58' are supported at their ends by opposed threaded shafts 59 and 59'. These threaded shafts are adapted to be rotated simultaneously for movement of the clamping members 58 and 58' in directions of the arrow A (FIG. 3) which is perpendicular or normal to the longitudinal direction of movement of carriage 62. A distance over which the clamping elements 58 and 58' move is preferably the length of the film negative 2 which is exposed to the other ends of the array 53 along their entire length. The shafts 59 and 59' are simultaneously rotated for movement of the clamping elements 58, 58' over the surface of the film negative 2 by a motor 100 (FIG. 3). This motor has shafts 91 extending from both ends with the shafts connected for suitable rotation by the motor 100. The shafts 91 are geared by intermeshing gears 92, 93 to the shafts 59, 59'. The motor 100 is preferably a motor which will operate at a uniform speed so as to cause the sweep in the direction of arrows A of the clamping members 58, 58' at a uniform speed rate.

Figure 8:
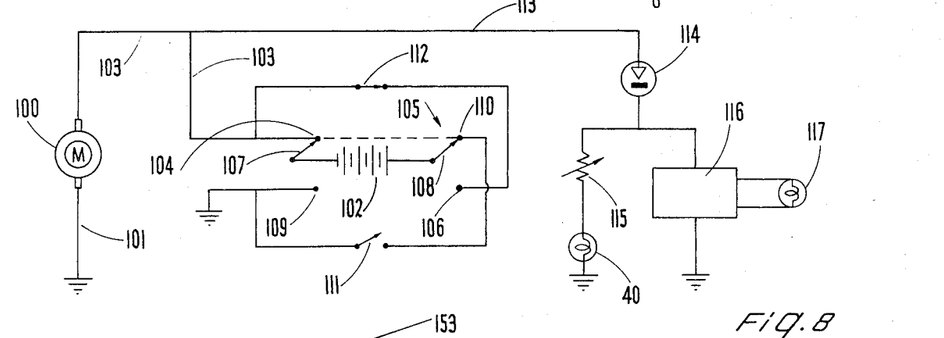
FIG. 8 is a schematic illustration of electrical circuitry useful in connection with the preferred embodiment illustrated in FIGS. 1 to 5 as well as in other embodiments.

The circuitry for operating the preferred embodiment shown in FIGS. 1 to 5 is illustrated in FIG. 8. In this arrangement the motor 100 has one terminal connected to ground through lead 101 and the other terminal connected in series to terminals 104 and 106 of the double pole, double throw push button switch 105. Terminals 109 and 110 of the switch 105 are connected in series to ground. Limit switch 111 is provided between terminals 109 and 110 and limit switch 112 is provided between terminals 104 and 106 of the push button switch 105. Connected to the positive terminal of the battery through lead 113 is a diode 114. The other terminal of diode 114 is connected to the lighting means comprising the light 40 through a variable resistor 115. If desired, a timing flasher of conventional design 116 having a lamp 117 adapted to flash at regular intervals is connected in parallel with the lamp 40. The time marker lamp 117 is connected to the flasher 116 for actuation at predetermined time intervals by the flasher 116.

In the operation of this circuit the double pole, double throw push button switch 105 when pushed will connect the motor to the power source 102 and thereby drive the carriage 58, 58' in a direction across the film negative 2. As the carriage 58, 58' moves across the negative the lamp 40 is lit. Light from the lamp 40 travels through the optical system, including the fiber 52. Light from the fiber 52 will enter one of the fibers in the array 53 depending upon the position of carriage 62 which in turn is controlled in a direction normal to the movement of the carriage 58, 58' by the rotation of the shaft 61. Rotation of shaft 61 is in turn controlled by the breath of the person breathing through the spirographic device. If a timing flasher 116 with a light 117 is used, the light 117 will be periodically activated at specific time intervals which are predetermined to provide marking indicators on the film negative. The light 117 is directed onto the film by a separate optical system described in the modifications hereafter.

After a tracing is effected by the lateral movement of the carriage 58, 58' across the negative, the carriage 58, 58' hits and opens the limit switch 111 thus causing the motor 100 to stop rotation. Upon release of the push button switch 105 the contacts 107 and 108 close to terminals 109 and 106 respectively thus connecting the motor once again to the power source 102 but in a reverse direction. This causes the motor to rotate in the opposite direction driving the carriage 58, 58' back to its initial starting position. When the carriage 58, 58' reaches its initial starting position it contacts limit switch 112 and opens that switch thereby turning the motor off until the push button is operated again. During the return cycle the diode is reversed biased so that the lamps do not glow, and thus no additional tracing is effected.

Figure 6:
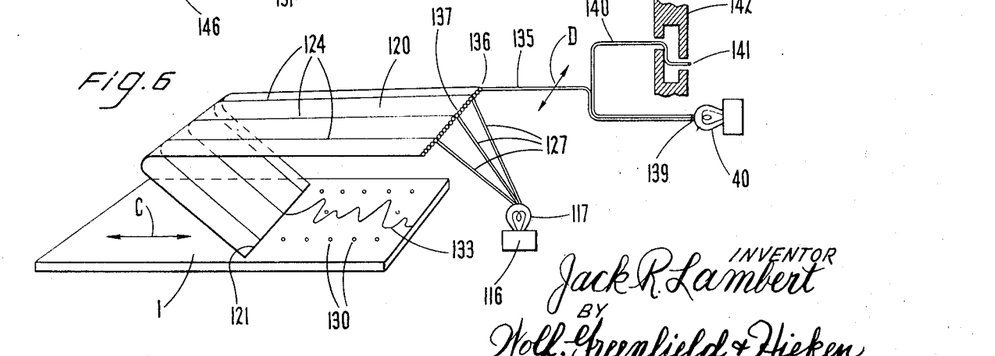
FIG. 6 is a schematic perspective fragmentary view of a modification of the invention which utilizes some of the components illustrated in FIGS. 1 to 5.

Referring to FIG. 6 there is illustrated schematically a modification of the invention in which means are provided for intermittently marking the light sensitive recording medium with coordinate markers. In this arrangement parts not illustrated may be similar to those described in connection with FIGS. 1 to 5. The array 120 of optical fibers is arranged with any selected number of fibers suitably supported in a flexible medium similar to the array 53 of FIG. 1. Means not shown but which may comprise means of the type previously described are provided to move the end 121 of the optical array 120 in a direction longitudinal of the recording means 1 as indicated by the arrow C. The recording means 1 which is schematically illustrated may comprise a recording medium of the type previously described. The array 120 of fiber optics includes at least one, and preferably at least three, optical fibers 124 which extend from the array 120 in segments 127 to the time marker lamp 117. The lamp 117 may be actuated by a suitable timing flasher 116 to flash at selected time intervals. The lamp 117 and flasher 116 may be actuated in the manner as described in connection with FIG. 8. As described, light generated from the light 117 passes through the optical fibers 124 and mark the recording medium 1 with marks 130 which are aligned according to the number of fibers 124 used. The distance between successive spots 130 in a line depend upon the speed with which end 121 of the array 120 is moved across the surface of the recording medium 1. These marks 130 thus provide coordinate markers against which the tracing 133 may be measured or compared. The tracing 133 is effected through the fiber generally illustrated at 135 which is generally similar to fiber 52 of the embodiment of FIG. 1. This fiber 135 is adapted to be moved in the directions of arrows D by means generally described previously. The end 136 of optical fiber 135 is adapted to be moved in longitudinal aligned relation with the ends 137 of the flexible array 120 so as to transmit light passing through the fiber 135 successively into the fibers of the linear array 120. Light may be provided for the fiber 135 by a light source 40 which is aligned with the fixed end 139 of the fiber 135 in a manner as previously described. A visual monitoring fiber 140 may be secured at one end to the light source 40 and at its other end 141 in a light trap 142 to provide constant visual monitoring of the position of the recording fiber 135.

Figure 7:
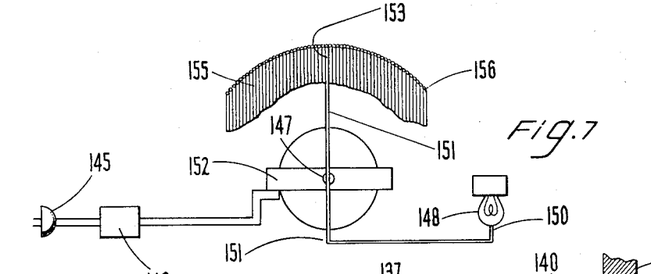
FIG. 7 is a schematic fragmentary illustration of a further modification of the invention.

FIG. 7 illustrated a partial schematic fragmentary elevation of a modification of the invention which is designed primarily for visually recording electrical signals instead of fluid flow signals or inputs. In this arrangement of the information input means 145 is designed for receiving electrical signals instead of signals in the form of variations in the flow of gas, air or fluid material.

In its simplest form the input means may comprise essentially a male electrical plug 145 which is adapted to be connected to the signal source. The plug 145 is electrically connected to the armature 152 of a meter through a suitable electrical circuit which may if desired include amplifier means 146 designed to control rotation of the armature about the axis 147 of the armature in a direction and with an amplitude related to the input signal. Thus the armature is designed to rotate in a direction and with an amplitude that is a measure of the input signal received by the input means 145. A light 148 is optically aligned with the end 150 of an optical fiber 151, said end being at the center of rotation 147 of meter armature 152. The optical fiber 151 is supported on the armature 152 and is adapted to have its other end 153 rotate with the armature of the meter. The end 153 of the fiber 151 thus serves as a pointer with this end 153 adapted to move in arcuate alignment with the ends 156 of the flexible optical fiber array 155. The ends 156 of the optical fiber array are arranged arcuately with the extreme ends in a common plane positioned to receive light from the end 153 of the fiber 151 as it is rotated by the meter armature 152 in response to input signals from the input means 145. The other end of the optical array 155 is suitably supported in a carriage for movement over a time period transversely across a recording medium by a mechanism similar to that described in connection with FIGS. 1 to 5.

Figure 9:
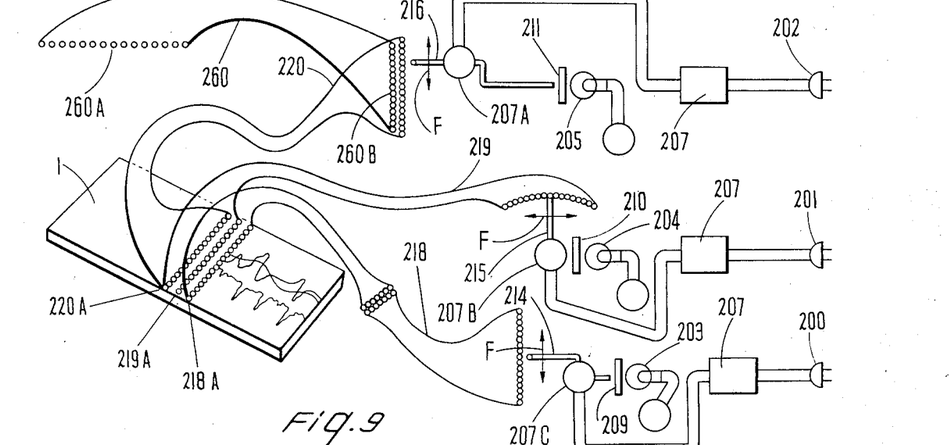
FIG. 9 is a schematic fragmentary perspective illustration of a further modification of the invention.

Referring now to FIG. 9 there is illustrated schematically a further modification of the invention designed to handle multiple input signals. In this arrangement components not specifically described may be similar to components in the embodiment as previously described. In the arrangement illustrated there is provided means for receiving a plurality of input signals. These input means 200, 201 and 202 may comprise an electrical connection, such as an electrical plug adapted to be connected to a signal source. For example the plugs 200, 201 and 202 may be connected to an electrical monitor of a wide variety of types in which signals received in different channels are to be recorded separately on a visual recording media. The input means 200, 201 and 202 are separately connected to drive means 207A, 207B and 207C through suitable amplifier means 207. These drive means may be of different types or of the same type. For example, drive means 207A may comprise a servomotor for movement of one end of the optical fiber 216 in the directions of arrow F in response to input signal variations received at input 202. Drive means 207B may comprise a meter armature for movement of one end of the optical fiber 215 arcuately in the directions of arrow F in response to signal variations received at input 201. Drive means 207C may comprise a servomotor for movement of one end of the optical fiber 214 in the direction of arrow F in response to input signal variations received at input 200.

The other ends of the optical fibers 214, 215 and 216 are connected respectively to lights 203, 204 and 205 through means for providing signals that differ from the signals generated in the other channels. These means may thus comprise an electrical chopper with the chopper generating signals of different lengths in each of the channels or, alternately, different color filters 209, 210 and 211. Thus the lights 203, 204 and 205 are respectively and 211. Thus the lights 203, 204 and 205 are respectively optically aligned with the filters 209, 210 and 211 and respectively the fibers 214, 215 and 216. These fibers are designed to have the end remote from the light source move in longitudinal alignment with the linear coherent array of multiple optical fibers 218, 219 and 220 respectively. The ends of the fibers 214, 215 and 216 adjacent respectively the array 218, 219 and 220 may be moved in reciprocal directions in longitudinal alignment with these arrays in a manner as previously described so that light from light 203 will pass through filter 209, the fiber 214 into one of the fibers comprising the array 218. Light from the light 204 will pass through the filter 210, the fiber 215 into one of the optical fibers comprising the array 219. And light from light 205 will pass through the filter 211, the optical fiber 216 and into one of the optical fibers comprising the array 220. The other ends of the arrays 218, 219 and 220 are commonly secured together in parallel aligned linear relationship by suitable binding means so that they form three immediately adjacent longitudinal arrays as illustrated at 218A, 219A and 220A. These ends 218A, 219A and 220A are reciprocally moved across the recording medium 1 in a manner as previously described in connection with the embodiment of FIG. 1. The recording medium 1 is preferably formed of a color negative film such as the type made by Polaroid Corp. so that signals from the input means may be selectively recorded in different colors in a manner as previously described.

If desired a visual monitor 260 may be provided in the form of a fiber bundle having one end 260A arranged longitudinally over a distance greater than the distance over which the other end 260B is arranged. End 260B is arranged to receive light from the moving end of fiber 216.

Figure 10:
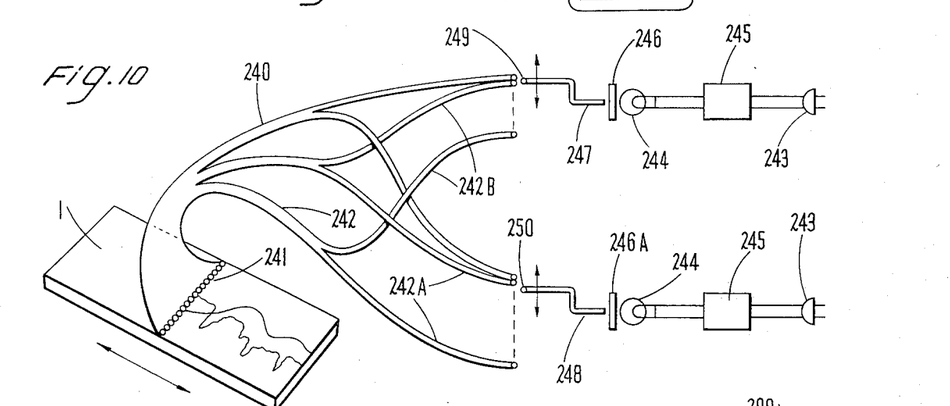
FIG. 10 is a schematic fragmentary perspective illustration of a further modification of the invention.

FIG. 10 illustrates a modification of a multi channel recorder. In this arrangement a single fiber optic array 240 is provided. One end 241 of this array is supported for reciprocal movement across a recording medium 1 which preferably comprises a color film negative of the type previously described. The other end of the array 240 is formed with each of the individual fibers split into multi-ends with the number of multi ends equal to the number of channels for recording. In the specific embodiment described provision is made for two channels and thus each individual fiber 242 of the array 240 is split into two ends 242A and 242B. The ends 242A are longitudinally aligned along one axis and the ends 242B are longitudinally aligned along a second axis preferably parallel to the first. Separate input means of the type previously described are provided for each of the channels and these means consist of an input signals means 243 connected to the light source 244 through an amplifier 245. Distinguishing color filters 246 and 246A are provided for each of these two channels. Light from one source will thus pass through filter 246 into fiber 247 while light from the other source will pass through filter 246A into the fiber 248. Fiber 247 is supported for movement of one end 249 in optical longitudinal alignment with the ends 242B while optical fiber 248 is supported for movement of its end 250 in longitudinal optical alignment with the fiber ends 242A. In this arrangement signals to receive the different channels will thus be transmitted along the common portions of the fiber array 240 in contrasting color as determined by the nature of the filters 246 and 246A.

Figure 11:
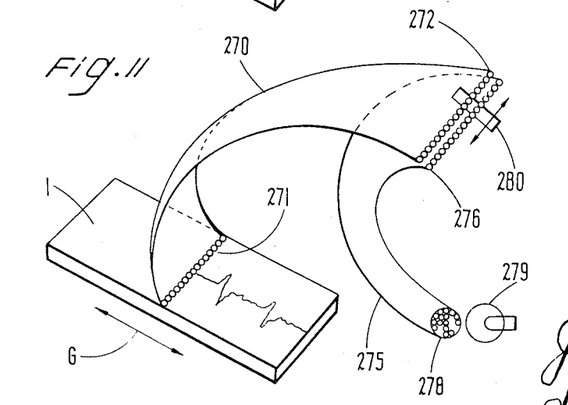
FIG. 11 is a schematic fragmentary perspective illustration of a further modification of the invention.
Figure 11A:
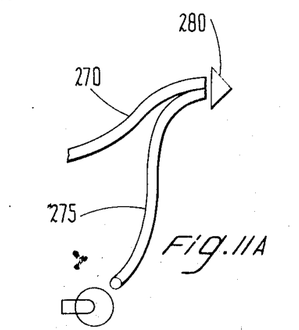
FIG. 11A is a schematic side view of a detail of the embodiment illustrated in FIG. 11.

FIGS. 11 and 11A illustrate the embodiment designed to minimize reaction on the signal source. In this arrangement the fiber optic array 270 has one end 271 secured in a linear array for movement longitudinal of the recording medium 1 in the direction of arrow G by means of the type previously described. The other end 272 of the array 270 is suitably secured in a longitudinal or linear array by a suitable clamping means. A second array 275 also has one end 276 secured in longitudinal adjacency to end 272 with these adjacent coextensive ends 272 and 276 secured in fixed relation to one another preferably with the fibers at the ends 272 and 276 in an adjacent parallel relation. The other end of the array 275 is formed into a bundle 278 arranged to receive light from a suitable light source 279. A suitably shaped prism or mirror 280 is supported for movement on a carriage in a direction parallel to the length of the ends 272 and 276 so that the prism 280 may receive a light from the array 275 and selectively reflect it into the array 270. The prism 280 may be moved on a carriage and by a mechanism of the type previously described so that light will be selectively reflected into array 270 in response to an input signal.

The invention also contemplates the utilization of other embodiments. For example, the input signal may consist of a high frequency signal such as derived from an oscilloscope, etc. Such a signal may be controlled and directed onto the aligned ends of a fiber optic array on the face of a cathode ray tube.

Also contemplated is an arrangement in which a moving opaque object is utilized between two aligned rays so as to interrupt light transmission and thereby attain a negative marking in place of the positive markings heretofore described. In this arrangement a two ended linear array is lighted at one end. An object such as a needle of a meter or shadow mask is mounted between the ends of the array and the light. The needle or mask is closely adjacent to the array so that its shadow is thrown onto it. The position of the opaque object is indicated at the opposite end of the array by dark fibers or fibers through which light is not passing. If a film is moved past one end of the array while the opaque object moves along the other, the trace of the object motion will appear as a dark trace on the film. If desired, the output end of the array may be used for remote visual monitoring of the opaque object position instead of recording it.

The invention also contemplates the use of an array for receiving light and transmitting it into a longitudinal aligned display. A single optical fiber having one end mounted for longitudinal movement in alignment with the lighted array has its other end supported for movement over a light sensitive paper. The single fiber is supported preferably on a shaft of the type described in connection with FIG. 1 for reciprocal movement depending upon the magnitude of the input signal. Thus light from a light source may be projected through the array and thence to a single fiber which moves relative to an input signal.

Figure 12:
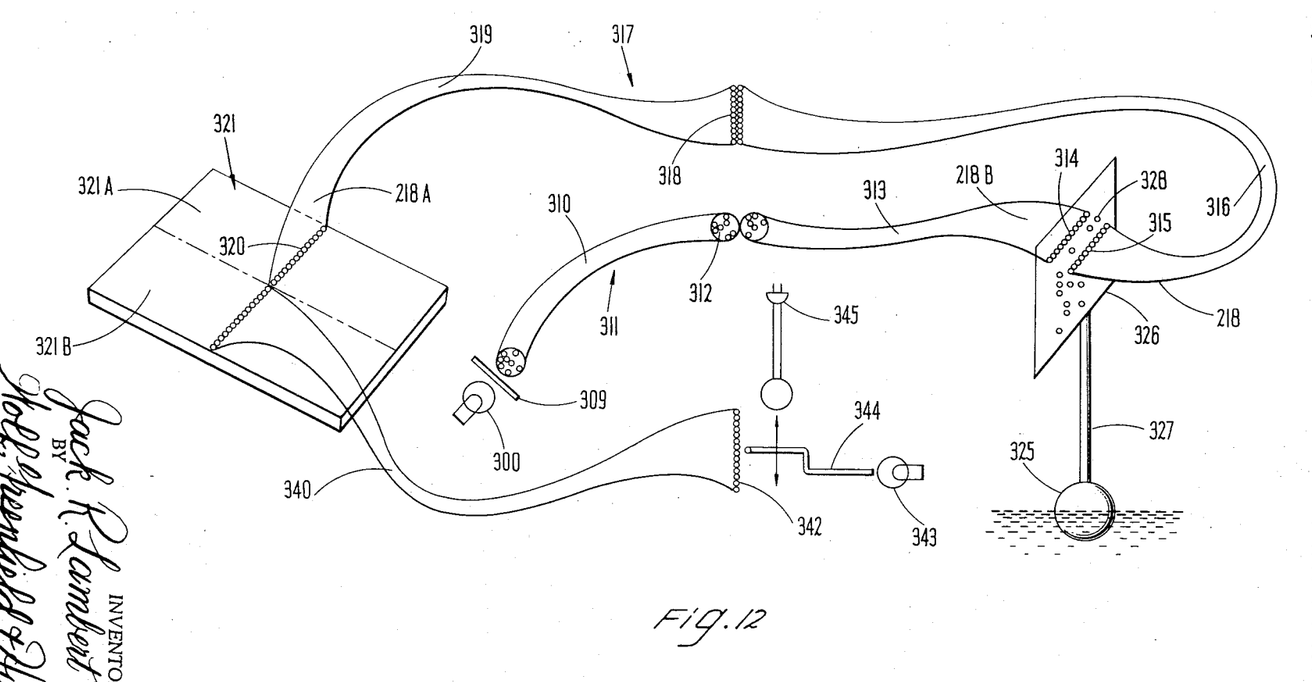
FIG. 12 is a schematic fragmentary perspective illustration of a still further modification of the invention.

Referring to FIG. 12 there is illustrated a further embodiment of the invention designed to handle multiple signals from a remote distance. In this arrangement components not specifically described may be similar to corresponding components in other embodiments.

In this arrangement a light source 300 which may be contained within a recorder casing is transmitted through a suitable lens 309 to a first segment 310 of a filter bundle 311. The segment 310 has an end 312 that is designed to be optically coupled for selective engagement and disengagement to one end of a second segment 313. The other end 314 of this second segment is formed in a linear array in spaced linear optical alignment with the end 315 of one segment 316 of a second fiber bundle 317. The fibers within segments 313 and 316 are preferably linearly aligned on a one for one basis. Segment 316 has another end which in turn is designed to be optically coupled for selective engagement and disengagement to one end 318 of a second segment 319. Segment 319 in turn comprising a flexible fiber bundle has its other end 320 suitably supported in a carriage (not shown) for movement over a time period transversely over the recording medium 321 by a mechanism similar to that previously described in connection with FIGS. 1 to 5.

The segments 313 and 316 of fibers may be positioned in a remote or inaccessible environment for monitoring the invironment. For example these segments may be positioned within a gasoline tank. In such an arrangement the ends of the segments 313 and 316 adapted to optically engage the detachable ends 312 and 318 of the other segments may project outwardly of the tank wall through a suitable aperature. Within the tank a float 325 moves up and down with the change in level of the gasoline. This float carries a suitable shadow mask 326 on a support 327. The shadow mask 326 is designed to move up and down between the aligned ends 314 and 315 and is provided with a series of selectively arranged apertures or slits 328 to permit selective passage of light through the mask from one end 314 to 315. A suitable guide for the mask may be provided. The apertures may be arranged in any desired code or geometric design including for example a binary code system to indicate by passage of light the particular level of the mask. Light passing through the fiber arrays is thus selectively modulated to and recorded on the recording medium 321 to indicate the position of the mask 326 and consequently the gasoline level. The length of segment 310 and 319 may vary over a considerable length, as for example 50 feet, thus permitting the positioning of all electric circuits at a point remote from the tank. The embodiment of FIG. 12 also illustrates a multi track recording system. The recording medium 321 is longitudinally divided to provide tracks 321A and 321B. Track 321A is used to record the signal previously described. Track 321B is provided with a second carriage system of the type described in FIGS. 1 to 5 to carry one end of optical fiber array 340 longitudinally of the recording medium over a time period in a manner as previously described. The other end 342 is connected to a suitable light source 343 through a single optical fiber 344. The fiber 344 is selectively aligned at one end with the end 342 in response to variations in an input signal derived in a manner as previously described from a signal source 345. Thus the arrangement permits simultaneous recording or recording at different times by multiple passes over the recording medium.

If desired the fiber arrays may be arranged with both ends of the same overall dimension and shape. Alternately they may be arranged with one end having a circular configuration and the other linear as illustrated in FIG. 11. Also the fibers may be compact to one end and spread at the other or tapered from one to the other end.

What is claimed is:

1. A recorder comprising means to support a recording medium upon which optically transmitted information may be recorded, information input means for receiving quantitatively varying information over a time period, a light source, means for transmitting light from said light source to said recording medium comprising a section of flexible optical fibers arranged parallel to one another and having the fibers at each end of said section arranged in a line along which the fiber locations represent progressively differing magnitudes of said information, one end of said section being selectively optically related to said light source and the other end of said section being movable and optically related to said recording medium, whereby a recording of said light from said light source may be made upon said recording medium, means responsive to information received by said information input means for causing light to be conducted from said source to the end of a selected fiber at said one end correponding in location to the magnitude of said information, thereby controlling the location along one axis of said recording means at which said transmitted light is recorded, and means for moving said other end along a second axis normal to said one axis to control the location on said recording medium at which said transmitted light is recorded at different time intervals.

2. A recorder as set forth in claim 1 having means for automatically turning off said light source as said other end of said section moves in one direction relatively to said recording medium.

3. A recorder as set forth in claim 1 wherein said last-recited means is adapted to produce uniform movement of said other end of said section relative to said recording medium along said second axis.

4. A recorder as set forth in claim 1 wherein said information input means includes means for receiving a fluid medium in varying quantities, and means responsive to the flow of said medium for activating said means responsive to information received by said information input means.

5. A recorder as set forth in claim 4 wherein said means for receiving a fluid medium includes a passage,
a rotatable shaft extending longitudinally of said passage,
a fan positioned in said passage and secured to said shaft rotatably by said fluid medium passing in said passage.

6. A recorder as set forth in claim 5 wherein said passage is adapted for connection with a patient's mouth to provide a spirometer.

7. A recorder comprising means to support a recording medium upon which optically transmitted information may be recorded, information input means for receiving quantitatively varying information over a time period, a light source, means for transmitting light from said light source to said recording medium including a first section having a length of optical fiber with one end in position to receive light from said source and a second section of optical fibers arranged parallel to one another and having the fibers at each end thereof arranged in a line along which the fiber locations represent progressively differing magnitudes of said information, one end of said second section being adapted to project light on said recording medium, the other end of said optical fiber in said first section being reciprocally movable relatively to and optically connectable with the other ends of the optical fibers in said second section, means responsive to said information input means for selectively optically connecting said sections at a location corresponding to the magnitude of said information, thereby controlling the location along one axis of said recording means at which said transmitted light is recorded, and means for moving said one end of said second section relatively to said recording medium along a second axis normal to said one axis to control the location on said recording medium at which said transmitted light is recorded at different time intervals.

8. A recorder as set forth in claim 7 wherein said information input means and said means responsive thereto includes a rotatable means adapted to be rotated in response to input signals,
a threaded shaft rotatable by said rotatable means, and
means reciprocated by said shaft in response to input signals, with said one end of said one section of said fiber system carried by said last named means.

9. A recorder as set forth in claim 8 wherein said means for controlling along a second axis includes a motor and carriage means operatively controlled by said motor for movement in directions of said second axis, said carriage means supporting and securing for movement therewith said one end of said second section.

References Cited

UNITED STATES PATENTS

| | | | |
|---|---|---|---|
| 1,597,487 | 8/1926 | St. Clair | 346—108 |
| 2,505,436 | 4/1950 | Serrell | 128—2.05 |
| 2,613,127 | 10/1952 | Geiser | 346—109 |
| 2,837,083 | 6/1958 | Lanooy | 128—2.08 |
| 3,027,219 | 3/1962 | Bradley | 346—110 |
| 1,663,308 | 3/1928 | Jenkins | 346—108 |
| 3,464,330 | 9/1969 | Lewis | 346—108X |

JOSEPH W. HARTARY, Primary Examiner

U.S. Cl. X.R.

128—2.08; 346—108; 350—96